United States Patent
Takayama et al.

(10) Patent No.: US 6,281,504 B1
(45) Date of Patent: Aug. 28, 2001

(54) DIAGNOSTIC APPARATUS FOR NUCLEAR MEDICINE

(75) Inventors: Takuzo Takayama; Takashi Ichihara, both of Otawara; Nobutoku Motomura, Nasu-gun, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/325,800

(22) Filed: Jun. 4, 1999

(30) Foreign Application Priority Data

Jun. 8, 1998 (JP) .................................................. 10-159201

(51) Int. Cl.$^7$ ............................... G01T 1/17; G01T 1/166

(52) U.S. Cl. ............................... 250/363.07; 250/370.09; 250/363.1; 250/363.04; 250/369

(58) Field of Search ............................... 250/369, 363.04, 250/363.07, 363.1, 370.06, 370.08, 370.09, 371; 378/7

(56) References Cited

U.S. PATENT DOCUMENTS

| | | | |
|---|---|---|---|
| 5,530,248 | * 6/1996 | Natanzon et al. | 250/363.07 |
| 5,903,008 | * 5/1999 | Li | 250/363.04 |
| 5,990,482 | * 11/1999 | Bertelsen et al. | 250/363.04 |
| 6,008,493 | * 12/1999 | Shao et al. | 250/363.04 |
| 6,123,078 | * 9/2000 | Grenier | 128/653.1 |
| 6,140,649 | * 10/2000 | Lonn | 250/363.04 |
| 6,194,724 | * 2/2001 | Kaoukab Raji | 250/363.04 |

FOREIGN PATENT DOCUMENTS

WO-98/33076-A1 * 7/1998 (WO) .............................. G01T/1/164

* cited by examiner

Primary Examiner—Constantine Hannaher
Assistant Examiner—Albert Gagliardi
(74) Attorney, Agent, or Firm—Oblon, Spivak, McClelland, Maier & Neustadt, P.C.

(57) ABSTRACT

A diagnostic apparatus for nuclear medicine capable of performing an operation of counting gamma rays for a TCT simultaneously with an operation of counting gamma rays for an SPECT has a SPECT counter for counting, as the number of photons, gamma rays passed through a SPECT energy window centered at a photoelectric peak of the SPECT gamma rays and a TCT counter for counting, as the number of photons, gamma rays passed through a TCT energy window centered at a photoelectric peak of the TCT gamma rays. The number of photons of the gamma rays passed through the SPECT energy window contains the number of photons of K-X rays generated due to a photoelectric effect produced by the TCT gamma rays in collimators of the detector. A K-X ray processor estimates the number of photons of mixed K-X rays on the basis of the number of photons counted at the TCT counter. The K-X ray correction processor performs K-X ray correction on the photon number counted at the SPECT counter on the basis of the photon number of the estimated K-X rays. Since the number of photons passed through the TCT energy window and number of photons of K-X rays passed through the SPECT energy window have a very strong correlation from the standpoint of probability statistics, the accuracy with which the number of photons of the K-X rays passed through the SPECT energy window is estimated is very high. It is, therefore, possible to effectively reduce the K-X rays passed through the SPECT energy window.

17 Claims, 4 Drawing Sheets a-b: 3cm
a-c: 5cm
a-d: 7cm
a-e: 9cm

WT(a): 21.0cm
WT(b): 20.1cm
WT(c): 18.5cm
WT(d): 15.7cm
WT(e): 10.8cm

DIAGNOSTIC APPARATUS FOR NUCLEAR MEDICINE

BACKGROUND OF THE INVENTION

The present invention relates to a diagnostic apparatus for nuclear medicine which is capable of so-called SPECT (Single Photon Emission Computed Tomography) for measuring, as a photon number, gamma rays emitted from radioactive isotopes (RIs) injected into a human subject and reconstructing an internal distribution (RI distribution) of the RIs on the basis of the measured value.

The performance of the SPECT depends upon the elements inherent in the apparatus, such as the detection sensitivity, non-uniformity of the detection sensitivity and spatial resolution as well as variation elements, such as an internal scattering and non-uniformity of the internal absorption.

The present invention is associated with the non-uniformity of an internal absorption. Known as the highest accurate method out of those methods for correcting the non-uniformity of the internal absorption is a method for locating a radiation source of nuclides the same as those injected into the human subject relative to a detection and measuring gamma rays which have been emitted from the radiation source and transmitted through a human subject. That is, the method comprises counting the transmitted gamma rays as a photon number, reconstructing a TCT (transmission computed tomography) corresponding to an absorption coefficient map on the basis of the counted value and correcting an RI distribution in accordance with the TCT or an absorption coefficient map from the TCT.

However, this method requires separate operations, that is, a count operation for the TCT and count operation for the SPECT. Thus, the total time of the count operations becomes very long.

A method for reducing the total time of these count operations has recently been developed. This method comprises performing a count operation for the TCT together with the count operation for the SPECT. According to this method, the total time of the count operations need only take about one half that required for the TCT or SPECT. It is, however, necessary to give such a design consideration that these count values, one for the TCT and one for the SPECT, are prevented from being mixed with each other.

In order to prevent the mixing of the count value for the TCT and count value for the SPECT, use is made, as the nuclide for the TCT, a nuclide which is different in photoelectric peak from the nuclide for the SPECT. For example, use is made, as the nuclide for the TCT, of $^{153}$Gd whose photoelectric peak is about 100 keV and, as the nuclide for the SPECT, of $^{201}$Tl whose photoelectric peak is about 70 keV. By doing so it is possible to selectively separate the photons for the TCT and those for the SPECT in accordance with their energies.

If, in actual practice, however, the RI distribution is corrected with the TCT, an artifact (false image) is generated in the corrected RI distribution. The inventors have specified one cause as the cause of the artifact.

That cause is as follows. That is, a collimator made of lead is mounted on the detector so as to collimate gamma rays. When the gamma rays from $^{153}$Gd in the radiation source produce a photoelectric effect in the collimator, electrons at the K shell are principally produced. And characteristic X-rays (K-X rays) are generated incidental to the electrons at the K shell and some of them is output outside the collimator.

The photoelectric peak of the K-X rays is about 75 keV, a level very near to that of $^{201}$Tl for the SPECT. For this reason, the K-X rays will pass through an energy window (64–78 keV) for the SPECT which is centered in the photoelectric peak of the K-X rays. As a result, the number of photons passed through the energy window for the SPECT becomes a sum of the number of photons from $^{201}$Tl for the SPECT plus the number of photons of the K-X rays passed through the energy window for the SPECT. That is, the number of the photons from the $^{201}$Tl for the SPECT was not able to be calculated with high accuracy.

BRIEF SUMMARY OF THE INVENTION

It is accordingly the object of the present invention to provide a diagnostic apparatus for nuclear medicine which can effectively reduce K-X rays passed through an energy window for an SPECT when a count operation for the TCT is effected simultaneously with a count operation for the SPECT.

The diagnostic apparatus for nuclear medicine which simultaneously performs a count operation of gamma rays for the TCT and count operation of gamma rays for the SPECT has an SPECT counter for counting, as the number of photons, gamma rays passed through an energy window for the SPECT which is centered at a photoelectric peak of gamma rays for the SPECT and TCT counter for counting, as the number of photons, gamma rays passed through an energy window for the TCT which is centered at a photoelectric peak for gamma rays for the TCT. The number of photons in the gamma rays passing through the energy window for the SPECT contains the number of photons in K-X rays generated through a photoelectric effect produced by the gamma rays for the TCT in a collimator of a detector. A K-X ray processor estimates the number of photons in the contained K-X rays on the basis of the number of photons counted at a TCT counter. The K-X ray correction processor performs a K-X ray correction of the photon number counted on an SPECT counter on the basis of the estimated K-X rays. Since the number of photons passed through the TCT energy window and that passed through the SPECT energy window have a very strong correlation from a standpoint of the probability statistics, the estimation accuracy of the photon number of the K-X rays passed through the SPECT energy window becomes very high. As a result, the K-X rays passed through the SPECT energy window can be reduced effectively.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A preferred embodiment of the present invention will be explained in more detail below with reference to the accompanying drawing.

The following is an explanation about a dual head type structure equipped with two detectors (camera heads), assuming that a single photon nuclide, emitting a single photon when RIs decay, is injected into a human subject and, by doing so, an RI distribution (SPECT) in a cross-sectional area is reconstructed. However, the present invention is not restricted to an SPECT/dual head type. The present invention can be applied to a planar RI distribution type and positron emission computed tomography type as well as to a single head type.

Figure 1:
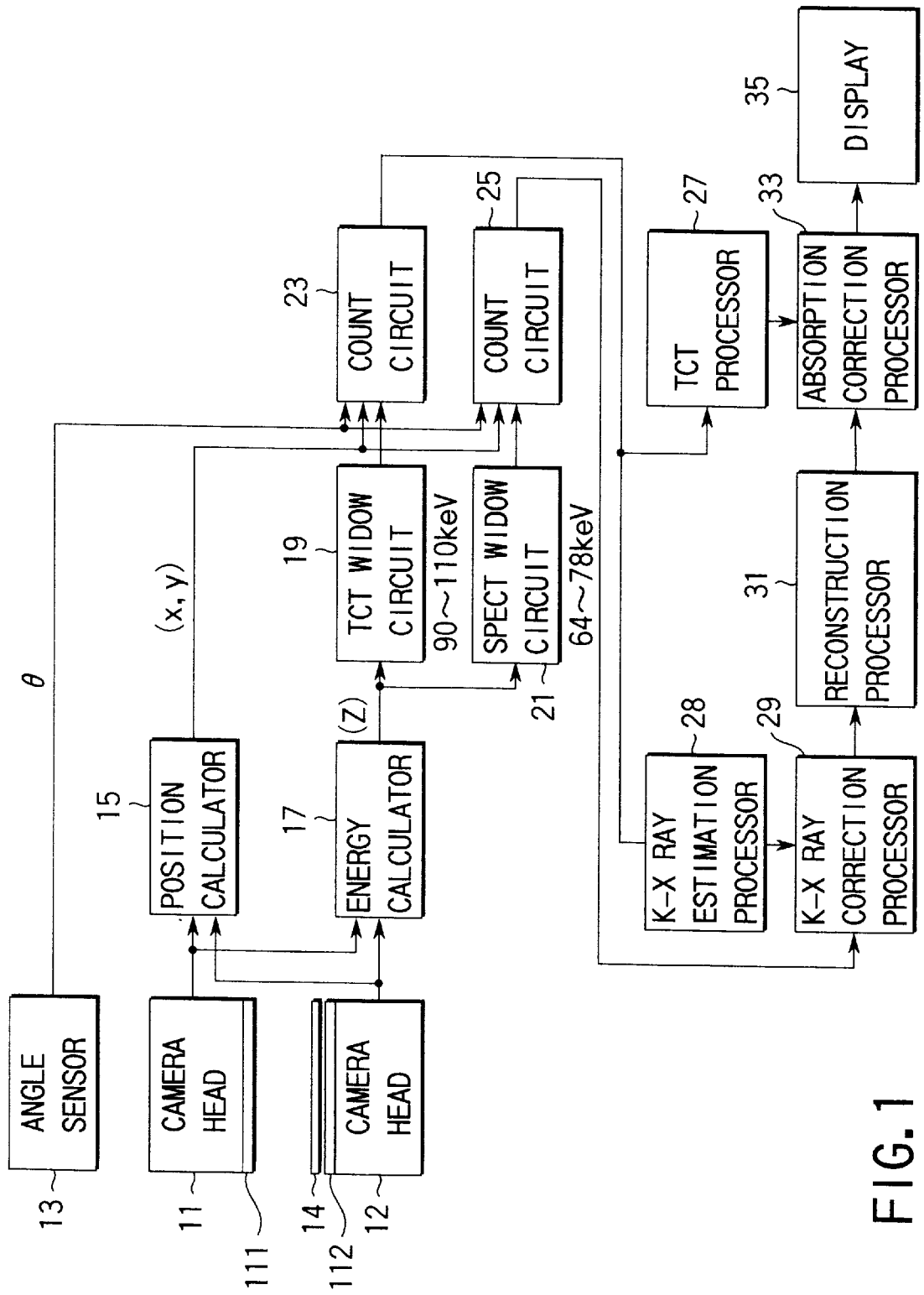
FIG. 1 is a block diagram showing an arrangement of a diagnostic apparatus for nuclear medicine according to a preferred embodiment of the present invention.

FIG. 1 is a block diagram showing an arrangement of a diagnostic apparatus, for nuclear medicine, according to the present invention. Detectors 11 and 12 may be either of a conventional Anger type or of a semiconductor array type which has recently been advanced toward a practical use. The detectors 11 and 12, being of the Anger type, are such that a scintillator is arranged at a back surface of each of collimators 111 and 112 made of lead and adapted to collimate gamma rays and receives gamma rays to generate a flash and that a plurality of photo-multipliers are arranged in a denser array with a light guide sandwiched relative to the back surface of the scintillator. The detectors 11 and 12, being of a semiconductor array type, are such that a plurality of semiconductor cells are arranged in a two-dimensional array relative to a back surface of collimators 111 and 112 so as to directly convert incident gamma rays to an electric signal of an amplitude corresponding to their energies.

The detectors 11 and 12 are supported on a stand. The stand can change the arrangement of the detectors 11 and 12. For example, the detector 11 is arranged in opposition to the detector 12 with a human subject sandwiched therebetween. Further, the detector 11 is so arranged relative to the detector 12 that it is located to a position 90°-displaced around a rotation shaft. The stand can be rotated around the circumference of the human subject. The rotation angle of the detectors 11 and 12 is sensed by an angle sensor 13 such as a rotary encoder. A rotation angle signal is supplied to counter circuits 23 and 25.

A plane type radiation source 14 is mounted at a front surface of the respective collimators of the detectors 11 and 12 or in place of the collimator.

A position calculator 15 calculates a gamma ray-incident position (x,y) on the basis of the outputs of the detectors 11 and 12. The calculated position signal is supplied to the counter circuits 23 and 25. An energy calculator 17 calculates a gamma ray's energy (z) on the basis of the outputs of the detectors 11 and 12. A corresponding energy signal is supplied to a TCT window circuit 19 and SPECT window circuit 21.

The energy window of the window circuit 19 is centered at a photoelectric peak (for example, 100 keV) of gamma rays emitted from the plane type radiation source 14 and set to, for example, a 20% width of the photoelectric peak. In this case, the energy window of the window circuit 19 is set to 90–110 keV. In this connection it is to be noted that the energy window of the window circuit 19 is referred to as a TCT energy window.

The energy window of the other window circuit 21 is centered to a photoelectric peak (for example, 70 keV) of the gamma rays emitted from RIs injected into the human subject and set to, for example, a 20% width of the photoelectric peak. In this case, the energy window of the window circuit 21 is set to 64–78 keV. In this connection it is to be noted that the energy window of the window circuit 19 is referred to as an SPECT energy window.

The window circuit 19 outputs one pulse to the counter circuit 23 when an energy signal (z) from the energy counter 17 is within a range of the TCT energy window. The window circuit 21 outputs one pulse to the counter circuit 25 when an energy signal (z) from the energy counter 17 is within a range of the SPECT energy window.

The counter circuits 23 and 25 count those pulses, which are output from the corresponding window circuits 19 and 21, for a predetermined period at each incident position (x,y) coming from the position calculator and at each rotation angle (θ) coming from the angle sensor. For the counter value (x,y,θ) counted by the counter circuit 23, the incident number of gamma rays emitted from the plane type radiation source 14 is dominant and, for the counter value counted by the counter circuit 25, the incident number of gamma rays emitted from the RIs injected into the human subject is dominant.

The counter circuits 23 and 25 perform a scattering ray correction by, for example, a TEW technique on the count value. The structural detail necessary to the scattering ray correction differs depending upon the technique used and it may be possible to use the known technique and construction. Here, any detail of the explanation will be emitted.

A TCT processor 27 reconstructs a TCT (transmission computed tomography) on the basis of a result of counting made by the counter circuit 23, the TCT representing the number of gamma rays (number of photons) transmitted through the human subject at a plurality of points in a cross-section. Further, the TCT processor 27 may find, based on the TCT, an absorption coefficient map representing the absorption coefficient relating to the plurality of points in the cross-section. The absorption coefficient "$\mu$" is given by a relational equation $$I_1 = I_0 \cdot e^{-\mu \cdot d}$$

$I_0$: the number of photons emitted from the radiation source in a given period;

$I_1$: the number of photons transmitted through the human subject and reaching the detector; and d: the thickness of the subject.

A K-X ray estimation processor 28 estimates the number of photons of K-x rays passed through the SPECT energy window, that is, K-X rays of those K-X rays generated due to the photoelectric effect occurring in the collimators (made of lead) of the detectors 11 and 12, on the basis of the number of photons of the gamma rays passed through the TCT energy window.

The estimation method of the number of photons of the K-X rays constitutes one of the most important features. The number of photons of the K-X rays passed through the SPECT energy window is estimated based on the number of photons passed through the TCT energy window. The inventors, assuming that the number of photons passed through the TCT energy window and number of photons of the K-X rays passed through the SPECT energy window have a very high correlation to the probability statistics based on both the photons being the same in their origin, have successfully specify this correlation. Based on this, they have succeeded in outstandingly enhancing the accuracy of estimation of the number of photons of the K-X rays passed through the SPECT energy window and effectively reducing the K-X rays passed through the SPECT energy window.

A K-X correction processor 29 performs a K-X ray correction on the result of counting by the counter circuit 25 on the basis of the K-x rays' photon number estimated by the K-X ray estimation processor 28. That is, the K-X ray correction processor 29 subtracts the K-X rays' photon number estimated by the K-X ray estimation processor 28 from the photon number of gamma rays passed through the SPECT energy window.

A reconstruction processor 31 reconstructs an RI distribution (SPECT) relating to the human subject's cross-section on the basis of the photon number on which the K-X ray correction is made. An absorption correction processor 33 corrects the SPECT, which is reconstructed by the reconstruction processor 31, in accordance with the TCT or absorption correction map. By doing so, it is possible to obtain the SPECT with an effect caused by the non-uniformity of the internal absorption (human subject) reduced. The display 35 displays this SPECT.

Now, an explanation will be given below about a method by which the K-X ray estimation processor 28 estimates the number of photons of K-X rays passed through the SPECT energy window. The data acquisition operation (TCT operation) handling gamma rays from the plane type radiation source as a target is performed simultaneously with the data acquisition operation (SPECT operation) handling gamma rays coming from RIs injected into the human subject as a target. It is assumed that the nuclides injected into the human subject are $^{201}$Tl, noting that this $^{201}$Tl has a photoelectric peak at about 70 keV. It is also assumed that the nuclide of the plane type radiation source 14 is $^{153}$Gd whose photoelectric peak is about 100 keV. In this case, the TCT energy window of the window circuit 19 is set to 90 to 110 keV. Further, the SPECT energy window of the window circuit 21 is set to 64 to 78 keV.

Figure 2:
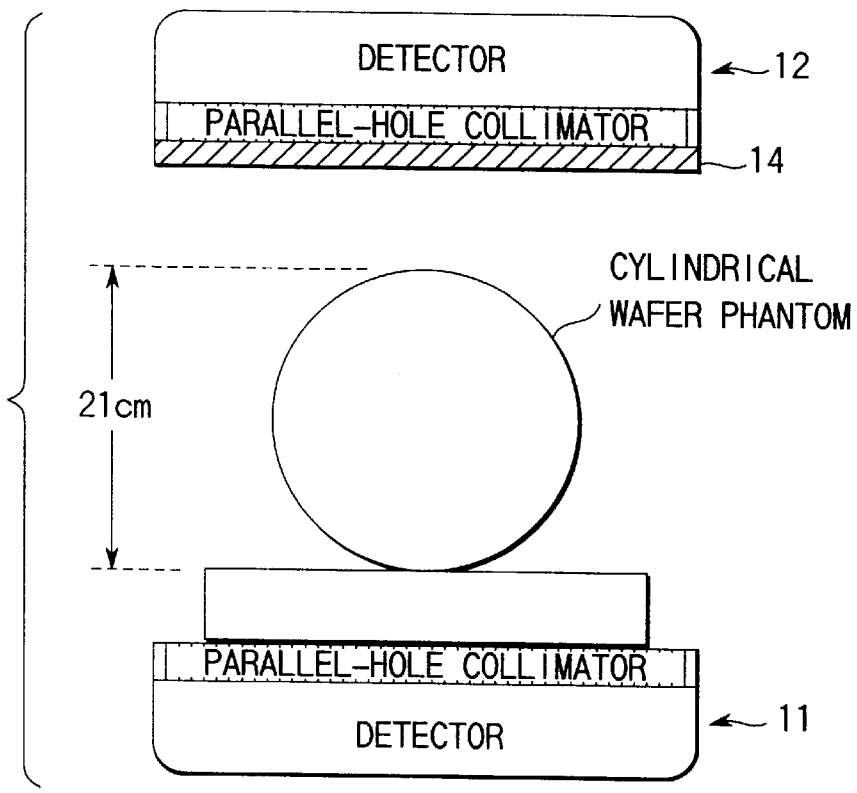
FIG. 2 shows an experimental system for obtaining a correlation function of the number of photons of K-X rays passed through an SPECT energy window (64–78 KeV) to the number of photons of $^{153}$Gd passed through a TCT energy window (90–110 keV) initially applied to a K-X ray estimation processor.

FIG. 2 shows an experimental system actually performed by the inventors to find an estimation function. The detector 12 is arranged in opposition to the detector 11 with a cylindrical water phantom sandwiched therebetween. The plane type radiation source 14 is mounted in front of the collimator of the detector 12.

Figure 3:
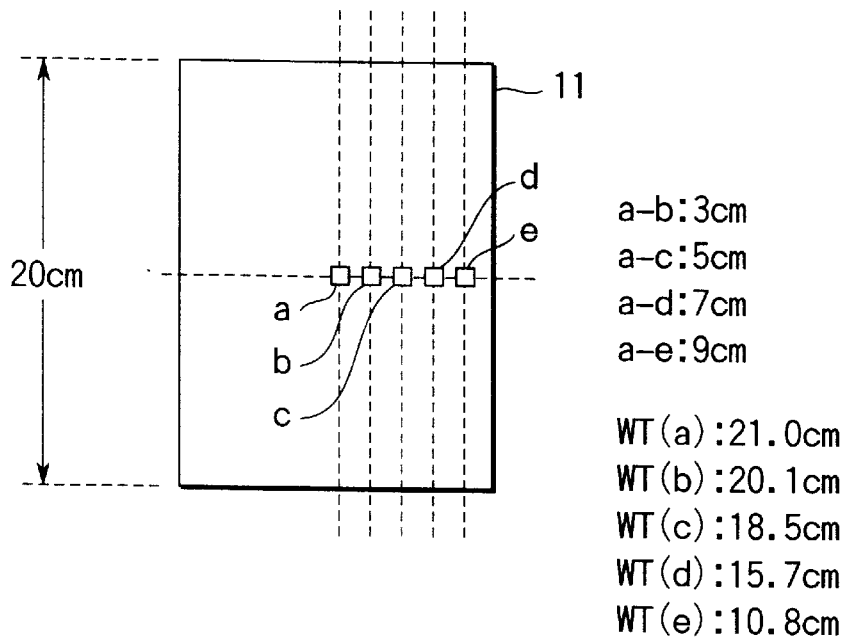
FIG. 3 shows one example of sample positions for obtaining the correlation function in the present embodiment.
Figure 4A:
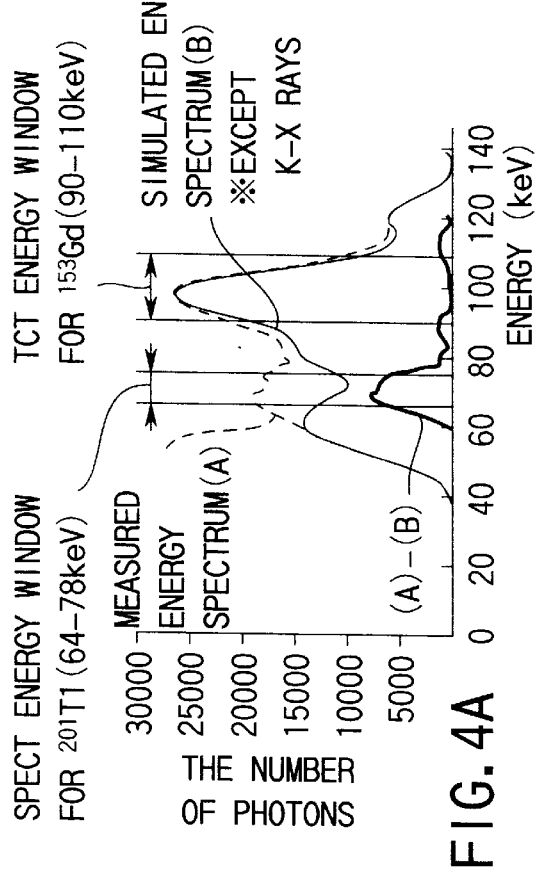
FIG. 4A shows an energy spectrum measured at a sample position "a" in FIG. 3 and a simulated energy spectrum.
Figure 4B:
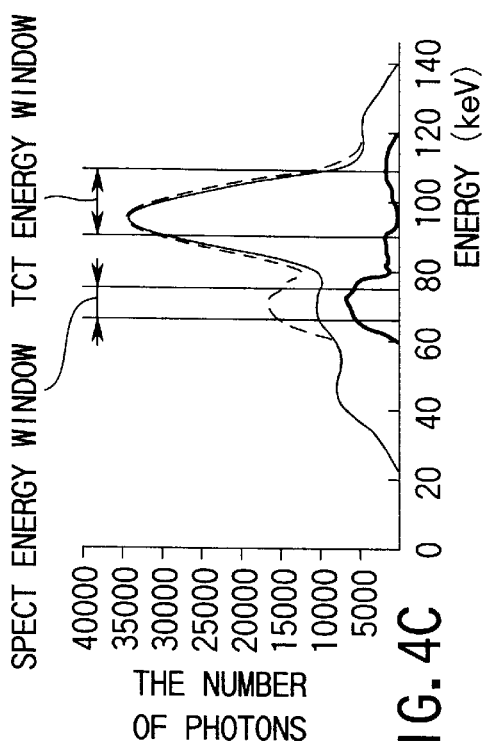
FIG. 4B shows an energy spectrum measured at a sample position "b" in FIG. 3 and a simulated energy spectrum.
Figure 4C:
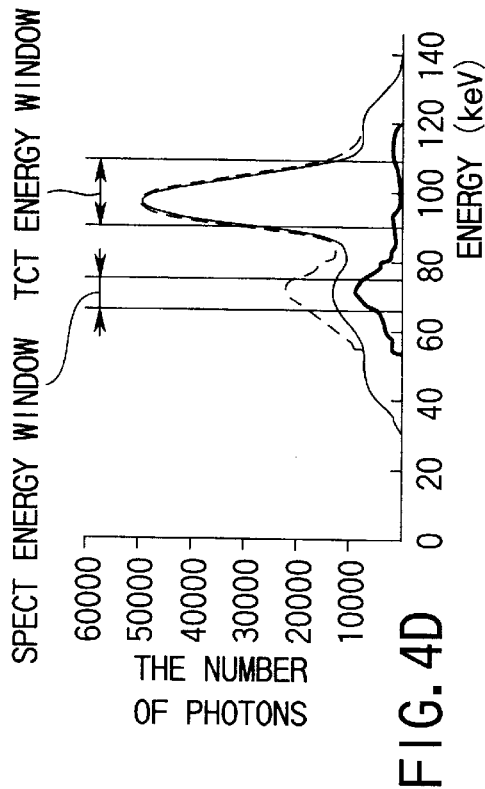
FIG. 4C shows an energy spectrum measured at a sample position "c" in FIG. 3 and a simulated energy spectrum.
Figure 4D:
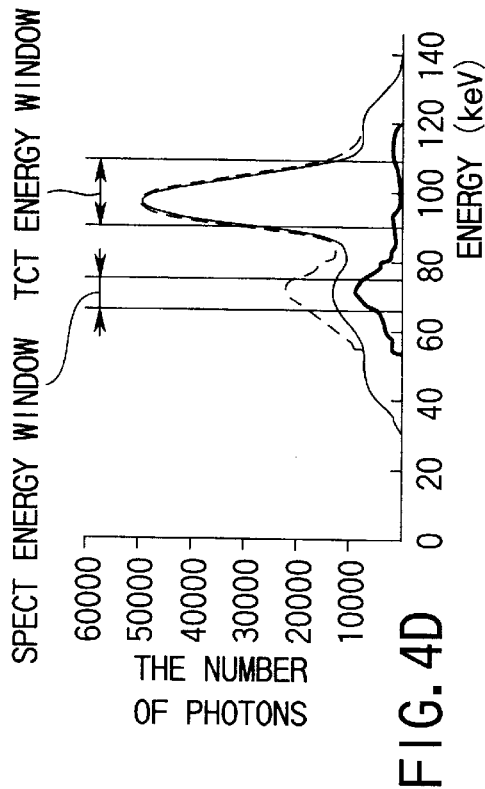
FIG. 4D shows an energy spectrum measured at a sample position in FIG. 3 and a simulated energy spectrum.
Figure 5:
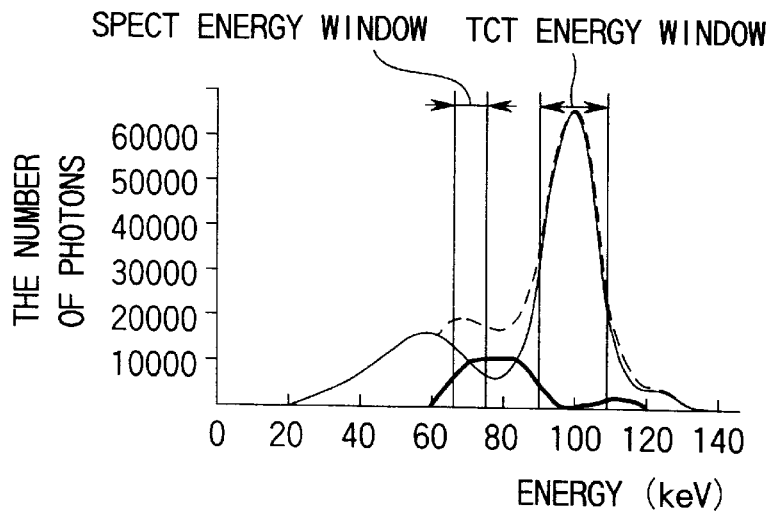
FIG. 5 shows an energy spectrum measured at a sample position "e" in FIG. 3 and a simulated energy spectrum.

Some of gamma rays coming from the plane type radiation source 14 pass through the water phantom and detected at the detector 11. With all gamma rays detected at the detector 11 as a target, measurement is made of an energy spectrum (photon number of respective energies) at 2 cm×2 cm sample positions a to e as shown in FIG. 3. FIGS. 4A, 4B, 4C and 5 show an energy spectrum (A) measured at the sample positions a to e.

An energy spectrum (B) of the sample positions a to e is simulated. The simulation is performed under the condition that no K-X rays are generated at the collimator, noting that the other conditions are the same as those under which the experimental system is performed. That is, the K-X rays' photon number is eliminated in the simulated energy spectrum.

By subtracting the simulated energy spectrum (B) from the measured energy spectrum (A) it is possible to obtain, in theory, an energy spectrum ((A)–(B)) with only the K-X ray as a target. The number of photons of gamma rays from $^{153}$Gd passed through the TCT energy window (90 to 110 keV) is calculated based on the measured energy spectrum (A). The number of photons of K-X rays from the $^{153}$Gd passed through the SPECT energy window is calculated based on the energy spectrum ((A)–(B)) relating to the K-X rays only.

Figure 6:
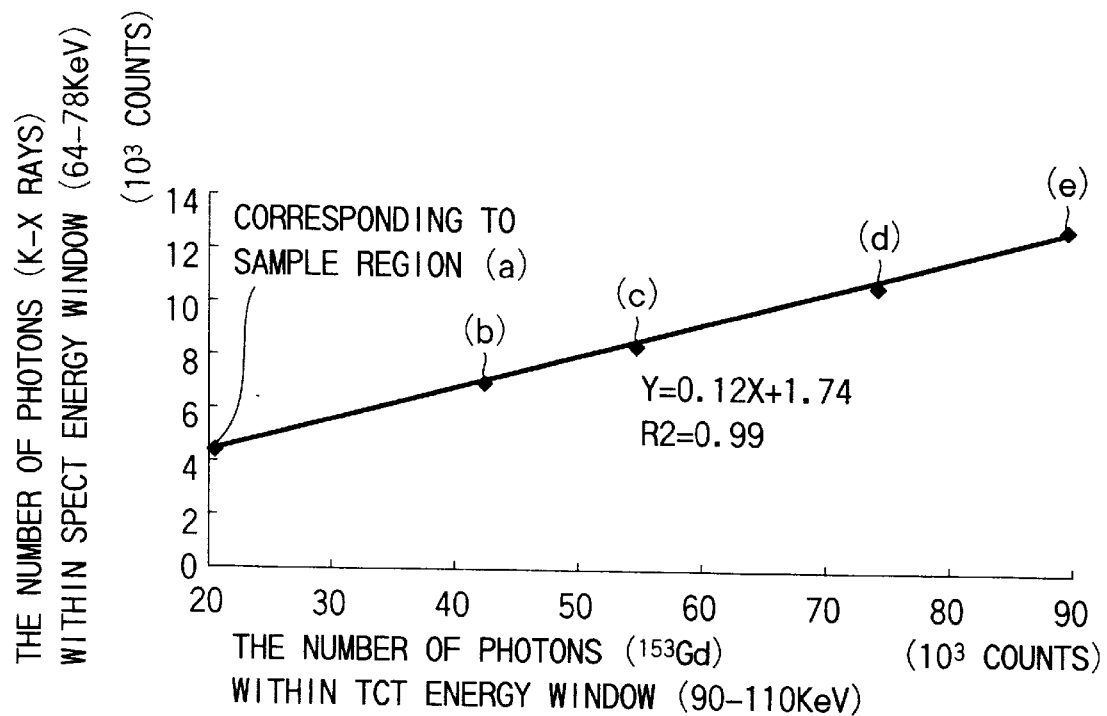
FIG. 6 shows one example of a correlation function obtained in the embodiment of the present invention.

The correlation of these calculated values is as shown in FIG. 6. The inventors have paid attention to the fact that the correlation of the number of photons from $^{153}$Gd passed through the SPECT energy window to the number of photons of gamma rays from $^{153}$Gd passed through the TCT energy window can be approximated to the linear function. With "X" representing the number of photons of gamma rays passed through the TCT energy window (90 to 110 keV) and "Y" representing the number of photons of the K-X rays passed through the TCT energy window (64 to 78 kev), the relation between both is given below.

$$Y=0.12\times X+1.74$$

The coefficient of the linear function tentatively corresponds to a combination of $^{201}$Tl and $^{153}$Gd and varies depending upon a combination of nuclides used and of collimators used. Under varied combinations it is possible to find a plurality of linear functions corresponding to varied collimators. Found linear function information are reserved in the K-X ray estimation processor 28 and one linear function is selected in accordance with a user's instruction representing a given combination of nuclides and kind of collimators.

By specifying a relation between the number of photons passed through the TCT energy window and the number of photons of the K-X rays passed through the SPECT energy window, that is, by specifying these numbers of photons in view of their strong correlation, it is possible to estimate, with high precision, the number of photons of the K-X rays passed through the SPECT energy window. By doing so, it is possible to effectively reduce K-X rays passed through the SPECT energy window.

The correction method using the above-mentioned linear function or functions can be applied not only to the elimination of K-X ray components but also to the elimination of various noise components, not to mention the elimination of scattered ray components.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A diagnostic apparatus for nuclear medicine, comprising:

a ray source for emitting gamma rays for a TCT;

collimators made of lead and arranged with a human subject sandwiched relative to the radiation source to collimate the gamma rays, the gamma rays containing the gamma rays for a TCT and gamma rays for an SPECT from RIs injected into the human subject;

a detector for detecting the collimated gamma rays;

an SPECT counter for counting, as the number of photons, those gamma rays passed through an SPECT energy window centered at a photoelectric peak of the SPECT gamma rays on the basis of an output of the detector in which case some of K-X rays generated due to a photoelectric effect produced by the TCT gamma rays in the collimator pass through the SPECT energy window;

a TCT counter for counting, as the number of photons, those gamma rays passed through a TCT energy window centered at a photoelectric peak of the TCT gamma rays on the basis of the output of the detector;

an estimation processor for estimating the number of photons of the K-X rays passed through the SPECT energy window on the basis of the number of photons counted by the TCT counter;

a K-X ray correction processor for subtracting the photon number of the estimated K-X rays from the photon number counted at the SPECT counter to perform a K-X ray correction on the photon number counted at the SPECT counter;

a reconstruction processor for reconstructing an SPECT relating to the RIs on the basis of the photon number on which the K-X ray correction is performed;

a TCT processor for generating a TCT on the basis of the photon number counted by the TCT counter; and an absorption correlation processor for correcting the reconstructed SPECT on the basis of the generated TCT.

2. A diagnostic apparatus according to claim 1, wherein the RIs injected into the human subject are $^{201}$Tl and the nuclide of the ray source is $^{153}$Gd.

3. A diagnostic apparatus according to claim 1, wherein the estimation processor is initially given correlation function information on the number of photons of the K-X rays passed through the SPECT energy window to the number of photons of the gamma rays through the TCT energy window.

4. A diagnostic apparatus according to claim 3, wherein the estimation processor is initially given a plurality of kinds of correlation function information on the number of photons of the K-X rays passed through the SPECT energy window to the number of photons of the gamma rays passed through the TCT energy window, the estimation processor selecting one kind of correlation function information in accordance with a user's instruction representing the kind of collimators.

5. A diagnostic apparatus according to claim 1, wherein the estimation processor is initially given linear function information representing a correlation of the number of photons of K-X rays passed through the SPECT energy window to the number of photons of gamma rays passed through the TCT energy window.

6. A diagnostic apparatus according to claim 1, wherein the estimation processor is initially given a plurality of kinds of linear function information representing a correlation of the number of K-X rays passed through the SPECT energy window to the number of photons of the gamma rays passed through the TCT energy window, the estimation processor selecting one kind of linear function information in accordance with a user's instruction representing the kind of collimator.

7. A diagnostic apparatus according to claim 1, wherein an operation of counting the gamma rays passed through the SPECT energy window is performed simultaneously with an operation of counting gamma rays passed through the TCT energy window.

8. A diagnostic apparatus for nuclear medicine, comprising:

a radiation source for emitting gamma rays for a TCT;

collimators made of lead and arranged with a human being sandwiched relative to the radiation source to collimate gamma rays, the gamma rays containing the TCT gamma rays and gamma rays for RI distribution coming from RIs injected into the human being;

a detector for detecting the collimated gamma rays;

a counter for RI distribution which counts, as the number of rays, gamma rays passed through an RI distribution energy window centered in a photoelectric peak of the RI distribution gamma rays in which case some of K-X rays generated due to a photoelectric effect produced by the TCT gamma rays in the collimator is passed through the RI distribution energy window;

a TCT counter for counting, as the number of photons, gamma rays passed through a TCT energy window centered at a photoelectric peak of the TCT gamma rays on the basis of an output of the detector;

a correlation processor for performing a K-X ray correction on the photon number counted at the RI distribution counter on the basis of the photon number counted by the TCT counter; and a processor for generating the RI distribution on the basis of the photon number on which the K-X ray correction is performed.

9. A diagnostic apparatus according to claim 8, wherein the RIs are $^{20}$Tl and the nuclide of the ray source is $^{153}$Gd.

10. A diagnostic apparatus according to claim 8, wherein the correction processor is initially given correlation function information on the number of photons of K-X rays passed through the RI distribution energy window to the number of photons of gamma rays passed through the TCT energy window.

11. A diagnostic apparatus according to claim 10, wherein the correction processor is initially given a plurality of kinds of correlation information on the number of photons of K-X rays passed through the RI distribution energy window to the number of photons of gamma rays passed through the TCT energy window, the correction processor selecting one kind of correlation function information in accordance with a user's instruction representing the kind of collimators.

12. A diagnostic apparatus according to claim 8, wherein the correction processor is initially given linear function information representing a correlation of the number of K-X rays passed through the RI distribution energy window to the number of photons of gamma rays passed through the TCT energy window.

13. A diagnostic apparatus according to claim 8, wherein the estimation processor is initially given a plurality of kinds of linear function information representing the number of photons of K-X rays passed through the SPECT energy window to the number of photons of gamma rays passed through the TCT energy window, the estimation processor selecting one kind of linear function information in accordance with a user's instruction representing the kind of collimators.

14. A diagnostic apparatus according to claim 8, wherein an operation of counting gamma rays passed through the RI distribution energy window is performed simultaneously with an operation of counting gamma rays passed through the TCT energy window.

15. A diagnostic apparatus for nuclear medicine capable of performing an operation of counting gamma rays for RI distribution and operation of counting gamma rays for a TCT, comprising:

a detector for detecting gamma rays for the RI distribution and gamma rays for the TCT;

a correction processor for correcting a count error of gamma rays for the RI distribution which is caused by caused by a photoelectric effect produced by the TCT gamma rays in collimators of the detector on the basis of a count result of the TCT gamma rays; and a processor for generating an RI distribution on a basis of a count result of the corrected RI distribution gamma rays.

16. A diagnostic apparatus according to claim 15, wherein the correction processor corrects the count error on the basis of a value derived by a linear function from the number of photons passed through the TCT energy window.

17. A diagnostic apparatus for nuclear medicine, comprising:

a ray source for emitting gamma rays for a TCT;

collimators made of lead and arranged with a human subject sandwiched relative to the ray source to collimate the gamma rays, the gamma rays containing the TCT gamma rays and gamma rays for RI distribution from RIs injected into the human subject;

a detector for detecting the collimated gamma rays;

a counter for RI distribution which counts, as the number of photons, gamma rays passed through an RI distribution energy window centered at a photoelectric peak of the RI distribution gamma rays on the basis of an output of the detector;

a TCT counter for counting, as the number of photon numbers, gamma rays passed through the TCT energy window centered at an electric peak of the TCT gamma rays on the basis of the output of the detector;

a correction processor for correcting the number of photons counted at the RI distribution counter on the basis of a value derived by a linear function from the number of photons counted by the TCT counter; and a processor for generating the RI distribution on the basis of the corrected photon number.

* * * * *